May 8, 1962 E. S. TAMM 3,033,249
POWDERED COFFEE DISPENSER
Filed March 15, 1956 2 Sheets-Sheet 1
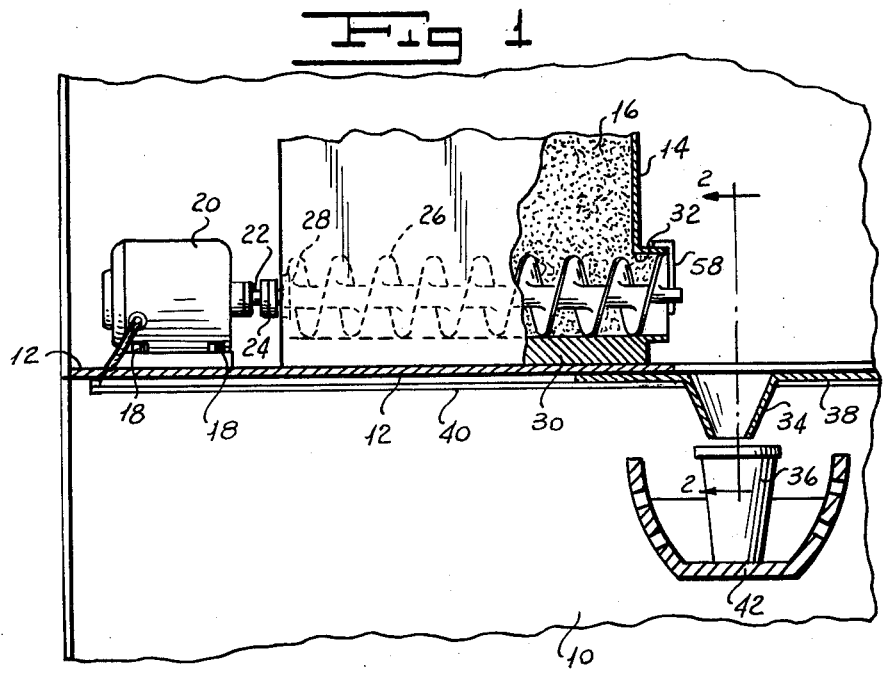
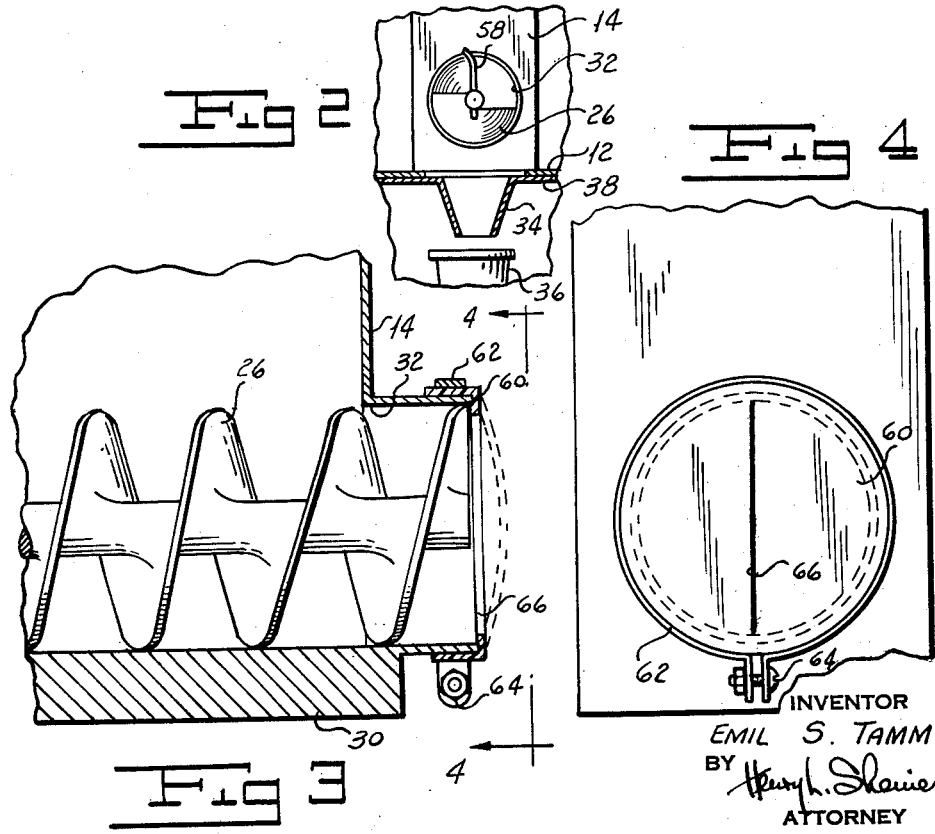
INVENTOR
EMIL S. TAMM
BY
ATTORNEY May 8, 1962   E. S. TAMM   3,033,249
POWDERED COFFEE DISPENSER
Filed March 15, 1956   2 Sheets-Sheet 2
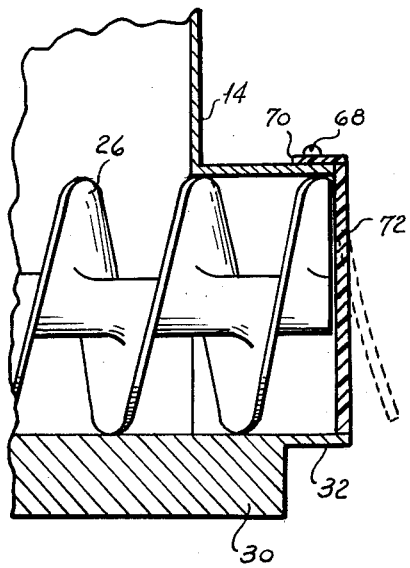
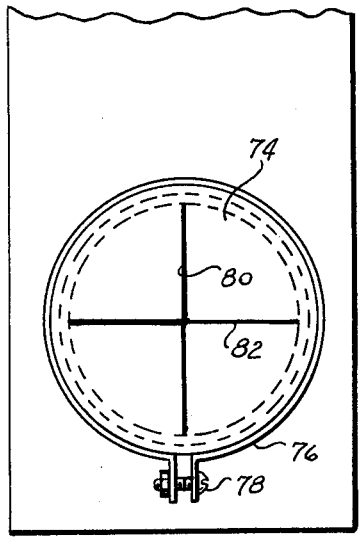
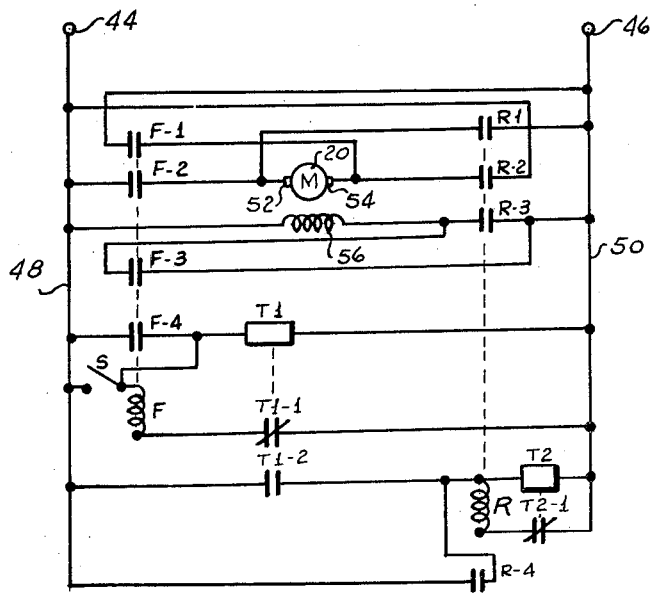
Fig. 7
INVENTOR
EMIL S. TAMM
BY Henry L. Shenier
ATTORNEY

3,033,249
POWDERED COFFEE DISPENSER
Emil S. Tamm, Elyria, Ohio, assignor to Rowe Manufacturing Co., Inc., Whippany, N.J., a corporation of New York
Filed Mar. 15, 1956, Ser. No. 571,708
6 Claims. (Cl. 141—369)

My invention relates to a powdered coffee dispenser and more particularly to a powdered coffee dispenser which avoids the formation of gummy coffee deposits on the dispensing mechanism.

In the prior art various means are employed for feeding quantities of powdered beverage components such as powdered coffee from containers through discharge openings into a cup or the like. After a dispensing operation in the machines of the prior art, some powdered coffee remains exposed in the means, such as a discharge port or the like, through which the coffee is dispensed. Powdered coffee is quite hygroscopic. When hot vapors such as steam come into contact with the powdered coffee, gummy, unsanitary deposits build up in the discharge port. Unless the machines are cleaned at frequent intervals, the deposits may build up over a period of time to a point where less than the desired amount of powdered coffee is discharged through the port on an operation of the machine. Further, the powdered coffee releasing mechansim may become inoperative. It has been suggested in the prior art that a flap be provided for sealing the discharge opening. This flap is opened only during the time when coffee is being fed through the discharge port and remains closed at all other times to prevent vapors from coming into contact with powdered coffee left in the discharge port after a dispensing operation. I have found that this prior art construction does not afford a satisfactory solution to the problem of avoiding a build-up of gummy deposits in the discharge port. In actual operation of these machines of the prior art, a coffee deposit builds up on the lip of the dispensing port to prevent the flap from closing the port after a dispensing operation. As a result, the purpose of the flap is defeated and vapors are free to come into contact with powdered coffee remaining exposed in the discharge port after a dispensing operation.

I have invented a dispenser for powdered coffee or the like which avoids the formation of deposits in the powdered coffee container discharge port. My dispenser accomplishes this object by clearing the discharge port of powdered coffee or the like remaining exposed in the port after a dispensing operation. As a result of the operation of my dispenser, no coffee remains in the discharge port with which vapor can come into contact.

One object of my invention is to provide a powdered coffee dispenser which avoids the formation of deposits in the powdered coffee container discharge port.

Another object of my invention is to provide a powdered coffee dispenser which clears the powdered coffee container discharge port of exposed powdered coffee remaining in the port after a dispensing operation.

A further object of my invention is to provide a powdered coffee dispenser in which no exposed powdered coffee remains in the powdered coffee container discharge port after a dispensing operation.

Other and further objects of my invention will appear from the following description:

In general, my invention contemplates the provision of a worm for feeding a predetermined quantity of a powdered beverage component, such as powdered coffee, from a container through a discharge port to a cup or the like. I provide my feeding worm with a reversible drive motor. When a beverage dispensing operation is initiated, the worm drive motor is energized to drive the worm to force a predetermined quantity of powdered coffee or the like through the discharge port. When this quantity has been discharged through the port, automatic means reverses the drive motor to turn the worm to withdraw exposed powdered coffee from the discharge port. I may provide my dispenser with a wiper for clearing the lip of the container discharge port as the worm turns. Alternately, I may provide the discharge port with a flexible flap or covering which permits the passage of powdered coffee under the influence of the drive worm while preventing vapor from entering the discharge port.

In the accompanying drawings which form part of the instant specification and which are to be read in conjunction therewith and in which like reference numerals are used to indicate like parts in the various views:

FIGURE 1 is a fragmentary elevation of my powdered coffee dispenser with some parts broken away and with other parts shown in section.

FIGURE 2 is a fragmentary elevation of my powdered coffee dispenser taken along the line 2—2 of FIGURE 1.

FIGURE 3 is a fragmentary sectional view, drawn on an enlarged scale, of a form of my powdered coffee dispenser including a slit, flexible covering for the container discharge port.

FIGURE 4 is a fragmentary elevation of the form of my powdered coffee dispenser shown in FIGURE 3 taken along the line 4—4 of FIGURE 3.

FIGURE 5 is a fragmentary sectional view, drawn on an enlarged scale, of another form of my powdered coffee dispenser including a pivoted flap for closing the discharge port opening.

FIGURE 6 is a fragmentary elevation of a further form of my powdered coffee dispenser including a cross-slit, flexible covering for the container discharge port, drawn on an enlarged scale.

FIGURE 7 is a schematic view of one form of electrical circuit which may be employed to control the drive motor of my powdered coffee dispenser.

More particularly referring now to the drawings, the merchandising machine with which my dispenser is used includes a support wall 10 on which I mount by any convenient means such as welding or the like a platform 12. The machine with which my dispenser is used may, for example, be of the type disclosed in my copending application, Serial No. 525,629, filed August 1, 1955, now Patent No. 2,796,893, for a Coffee Dispensing Machine. Platform 12 supports a container 14 for a supply of a powdered component, such as powdered coffee 16 or the like, of a beverage. Bolts or the like 18 secure a motor 20 on platform 12. Motor 20 includes an output shaft 22 connected by means such as a flexible coupling 24 to a feed worm 26 rotatably supported at one end in a bearing 28 carried by a side of the container 14. Conveniently, worm 26 rests on the base 30 of container 14. I form a side of container 14 with a cylindrical discharge port 32 through which a predetermined quantity of powdered coffee is to be discharged in the course of a beverage dispensing operation.

As can be seen by reference to FIGURE 1, an end of worm 26 extends into discharge opening 32. As the motor 20 drives its shaft 22 in one direction, worm 26 rotates to force a quantity of powdered coffee 16 through discharge port 32. After passing out of the port 32, the powdered coffee or the like is directed by a chute 34 to a cup 36 or the like in which the beverage such as hot coffee is to be dispensed.

As is disclosed in my said copending application, chute 34 is formed in a slide 38 carried by guides 40 mounted on the underside of platform 12. Slide 38 reciprocates below an opening in platform 12. A platform 42 mounted on the cabinet suporting wall 10 supports cup 36 in a position to receive powdered coffee from chute 34.

It will be appreciated that after worm 26 rotates in a direction to force a quantity of powdered coffee out of discharge port 32, a quantity of the powdered coffee remains exposed in the port. In order to withdraw this quantity of powdered coffee from discharge port 32 to prevent the formation of a deposit in the port, I provide means for reversing the direction of rotation of worm 26 to withdraw this remaining exposed quantity of coffee.

Referring now to FIGURE 7, one form of control circuit of the merchandising machine with which my dispenser is used includes a source of electrical potential having respective terminals 44 and 46 to which I connect respective conductors 48 and 50. Respective normally open, forward drive switches F-1 and F-2 connect the respective brushes 54 and 52 to conductors 50 and 48. I connect the motor field winding 56 and a normally open, forward drive switch F-3 in series between conductors 48 and 50. I connect a normally open switch S, a forward drive relay winding F and a normally closed switch T1-1 in series between conductors 48 and 50. When, in the course of a beverage dispensing operation, powdered coffee is to be directed to cup 36, means (not shown) known to the art; such as a cam, a solenoid, or the like, closes switch S to energize winding F through switch T1-1. Energization of winding F closes normally open switches F-1, F-2 and F-3 to complete the forward drive circuit of motor 20. Energization of winding F also closes a normally open switch F-4 connected in series with a time relay winding T1 between conductors 48 and 50. As is known in the art, the switch S is closed only momentarily. Closing of switch F-4 completes a holding circuit for winding F after switch S opens. Closing of switch F-4 also completes the circuit of time relay winding T1. A predetermined time after its circuit is completed, relay winding T1 opens its associated normally closed switch T1-1 to interrupt the circuit of the forward drive relay winding F. During the period of time from the closing of switch S to the opening of switch T1-1, motor 20 drives worm 26 in a direction to force powdered coffee out of the discharge port 32. When switch T1-1 opens, the flow of powdered coffee through discharge port 32 stops.

I connect a normally open switch T1-2 associated with winding T1 in series with a reversing relay winding R and a normally closed switch T2-1 in series between conductors 48 and 50. When winding T1 operates momentarily to close switch T1-2, reversing relay winding R is energized to close normally open switches R-1, R-2, R-3 and R-4. The respective switches R-1 and R-2 connect brushes 52 and 54 to conductors 50 and 48 to complete the reverse drive circuit of the armature of motor 20. Switch R-3 is connected in series with field winding 56 by the conductors 48 and 50. Switch R-4 by-passes the momentarily closed switch T1-2 to complete a holding circuit for winding R after switch T1-2 opens. I connect the reversing drive circuit time relay winding T2 in parallel with winding R and switch T2-1. It will be seen that the circuit of winding T2 is completed upon the closing of switch T1-2 and is held complete by switch R-4. A predetermined time after its energization, winding T2 opens is associated switch T2-1 to interrupt the circuit of winding R to stop motor 20. The time delay provided by winding T2 is just sufficient to cause a rotation of worm 26 which will withdraw the exposed powdered coffee remaining in port 32 after an amount of coffee has been discharged through the port. It will be seen that this reverse drive of worm 26 clears powdered coffee out of the discharge port 32.

In the form of my invention shown in FIGURE 1, I mount a wire wiper 58 by any convenient means on the end of worm 26 extending through the discharge port 32. Wiper 58 is in engagement with a lip of port 32. As the worm rotates to discharge a quantity of powdered coffee through port 32 and as the worm rotates in the reverse direction to clear powdered coffee out of the port, wiper 58 scrapes the lip of the port to dislodge any particles of powdered coffee which may stick to the delivery port lip. It will be seen that the wiper 58 assists the worm in preventing the accumulation of coffee deposits on or in port 32.

In the form of my invention shown in FIGURES 3 and 4, I close the discharge port opening by means of a flexible diaphragm or seal 60 sealed over the discharge port opening by means of a band 62 held in position by a screw 64. Seal 60 may be formed of any suitable material such as rubber, elastic plastic, or the like. In order to permit passage of the powdered coffee out of the discharge port 32, I form a slit 66 in seal 60. When worm 26 turns in a direction to feed powdered coffee to the right as viewed in FIGURE 3, the seal 60 flexes to the position indicated by the broken lines in FIGURE 3 to permit powdered coffee to pass out of the opening. After worm 26 reverses, the seal 60 flexes back to its initial position and slit 66 closes effectively to prevent entry of vapors into container 14 through port 32. It will be seen that the seal 60 permits the passage of powdered coffee out of port 32 while preventing the entry of vapors into the port.

In the form of my invention shown in FIGURE 5, a screw 68 secures a tab 70 of a relatively thick flap 72 to the discharge port 32. In its normal position flap 72 closes the opening of port 32 to prevent entry of vapors into the discharge port. When powdered coffee is to be delivered through discharge port 32, flap 72 flexes or pivots to the broken-line position to permit the coffee to pass out of the discharge port. When worm 26 stops feeding, flap 72 flexes back to its initial position effectively to prevent entry of vapors into port 32. It will be remembered that after having forced a quantity of powdered coffee out of the port 32, worm 26 reverses to clear the discharge port of coffee. Thus, no coffee remains in the port which could form a build-up which would prevent proper operation of flap 72.

In the form of my invention shown in FIGURE 6, I secure a flexible seal 74 formed of rubber or the like over the opening of port 32. A band 76, the ends of which are secured by a screw 78, holds seal 74 over the opening on port 32. In this form of my invention, in order to permit passage of coffee out of the port 32, I form seal 74 with a pair of cross slits 80 and 82 at right angles to each other. When worm 26 turns in a direction to force coffee out of port 32, the seal sectors formed by slits 80 and 82 flex to permit the powdered coffee to pass out of the discharge port 32. After the coffee has been dispensed, the seal sections return to their initial positions effectively to prevent entry of vapors into the port.

In operation of my powdered coffee dispenser, at a point in the dispensing cycle at which powdered coffee is to be added to the hot water, means (not shown) known to the art such as a solenoid, cam, or the like, closes switch S to energize winding F through normally closed switch T1-1. Energization of winding F closes normally open switches F-1, F-2 and F-3 to complete the forward drive circuit of motor 20. Closing of switch F-4 completes a holding circuit for winding F and energizes time delay relay winding T1. Energization of motor 20 to drive in a forward direction rotates worm 26 in a direction to force powdered coffee out of the discharge port 32. A predetermined time after its energization, winding T1 opens the normally closed switch T1-1 to deenergize winding F and thus to interrupt the forward drive circuit of motor 20. At the same time, winding T1 momentarily closes normally open switch T1-2 to complete the circuit of reversing relay winding R through normally closed switch T2-1. Energization of winding R closes normally open switches R-1, R-2 and R-3 to complete the reverse drive circuit of motor 20. Winding R also closes normally open switch R-4 to complete its holding circuit and the holding circuit for reverse drive timing winding T2. When motor 20 rotates in the reverse direction, worm 26 turns to clear discharge port 32 of coffee forced into the port during the forward drive of motor 20. A predetermined time after its energization, winding T2 opens normally closed switch T2–1 to de-energize winding R and interrupt the reverse drive circuit of motor 20. My dispenser is then ready for the next dispensing operation of the machine with which it is used.

In the operation of my dispenser, wiper 58, if employed, clears the port 32 of coffee. If a seal 60, a seal 74, or a flap 72 is employed, it performs its function of preventing entry of vapors into the discharge port while permitting powdered coffee to pass out of the port.

It will be seen that I have accomplished the objects of my invention. I have provided a powdered coffee dispenser which avoids the formation of deposits in the dispenser discharge port. My dispenser clears the discharge port of powdered coffee remaining in the port after a quantity of powdered coffee has been discharged through the port. My dispenser ensures that no coffee remains in the discharge port after a dispensing operation. I may provide my dispenser with a wiper which clears the edge of the lip of the discharge port. Alternately, I may provide my dispenser with means for sealing the discharge port opening against the entry of vapors while permitting the passage of powdered coffee out of the discharge port.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a merchandising machine for dispensing a hot beverage comprising hot liquid mixed with a powdered component in a cup upon the deposit of a charge of said component and the deposit of a charge of said hot liquid in sequence in said cup and having a member movable in response to an operation of the machine, a dispenser for dispensing said powdered component including a container for said component, a horizontally extending cylindrical discharge port communicating with the interior of said container and having an open end through which said powdered component is delivered to said cup, means for supporting said cup below said discharge port open end in a position to receive said powdered component from said port, a worm for feeding said powdered component out of said port through said open end, said worm extending to the open end of said port, drive means for said worm, means responsive to movement of said movable member for energizing said drive means to drive the worm to feed said powdered component through said open end to said cup and means for reversing said drive means after a determined charge of said powdered component has been deposited in the cup to clear said powdered component from said port to prevent vapor from contacting a quantity of said component which otherwise would remain in said port.

2. A dispenser as in claim 1 in which said discharge port is formed with a lip and including a wiper carried by said worm for stripping said lip as said worm rotates.

3. A dispenser as in claim 1 including a slit flexible seal for said discharge port.

4. A dispenser as in claim 1 including a flap normally sealing said discharge port.

5. A dispenser as in claim 1 including a cross-slit seal for said discharge port.

6. A dispenser as in claim 1 in which said reversing means is time controlled.

References Cited in the file of this patent

UNITED STATES PATENTS

| 1,368,934 | Jackson | Feb. 15, 1921 |
| 1,507,516 | Richardson | Sept. 2, 1924 |
| 1,519,664 | Campbell | Dec. 16, 1924 |
| 1,713,886 | Benzon | May 21, 1929 |
| 1,778,589 | Eerkes | Oct. 14, 1930 |
| 1,993,693 | Tanner | Mar. 5, 1935 |
| 1,996,156 | Janssen | Apr. 2, 1935 |
| 2,107,226 | Weston | Feb. 1, 1938 |
| 2,699,272 | Barth | Jan. 11, 1955 |
| 2,776,078 | Raynor | Jan. 1, 1957 |

FOREIGN PATENTS

| 464,834 | Italy | July 23, 1951 |